United States Patent
Maier, Jr. et al.

(10) Patent No.: US 7,363,520 B1
(45) Date of Patent: Apr. 22, 2008

(54) TECHNIQUES FOR PROVIDING POWER TO A SET OF POWERABLE DEVICES

(75) Inventors: Paul H. Maier, Jr., Athol, MA (US); Keith A. Morrissette, Whitinsville, MA (US)

(73) Assignee: EMC Corporation, Hopkinton, MA (US)

( * ) Notice: Subject to any disclaimer, the term of this patent is extended or adjusted under 35 U.S.C. 154(b) by 407 days.

(21) Appl. No.: 11/092,006

(22) Filed: Mar. 29, 2005

(51) Int. Cl.
  *G06F 1/26* (2006.01)
(52) U.S. Cl. .......................................... 713/300; 714/6
(58) Field of Classification Search ................ 713/300; 714/6
  See application file for complete search history.

(56) References Cited

U.S. PATENT DOCUMENTS

| | | | |
|---|---|---|---|
| 5,381,554 A * | 1/1995 | Langer et al. | 714/14 |
| 5,694,329 A * | 12/1997 | Pomatto | 700/286 |
| 6,735,704 B1 * | 5/2004 | Butka et al. | 713/300 |
| 6,833,634 B1 * | 12/2004 | Price | 307/18 |
| 6,917,124 B2 | 7/2005 | Shetler, Jr. et al. | 307/66 |
| 6,944,854 B2 * | 9/2005 | Kehne et al. | 717/168 |
| 7,149,692 B1 * | 12/2006 | Wu | 704/270 |
| 7,154,723 B1 * | 12/2006 | Warnakulasooriya et al. | 361/62 |
| 2004/0123165 A1 * | 6/2004 | Wierzbicki et al. | 713/300 |
| 2005/0248311 A1 * | 11/2005 | Komaki et al. | 320/112 |
| 2006/0112305 A1 * | 5/2006 | Cagno et al. | 714/6 |

* cited by examiner

*Primary Examiner*—Chun Cao
*Assistant Examiner*—Vincent T Tran
(74) *Attorney, Agent, or Firm*—BainwoodHuang

(57) ABSTRACT

An improved power supply subsystem, which is automatically updatable, includes a first power supply having a first power circuit, a first controller adapted to control operation of the first power circuit, a first interface adapted to connect the first controller to an external device, and a first bi-directional peer-to-peer port. The power supply subsystem further includes a second power supply having a second power circuit, a second controller adapted to control operation of the second power circuit, a second interface adapted to connect the second controller to the external device, and a second bi-directional peer-to-peer port. The power supply subsystem further includes a bi-directional peer-to-peer communications channel interconnecting the first bi-directional peer-to-peer port of the first power supply and the second bi-directional peer-to-peer port of the second power supply to form, between the first and second power supplies, a communications link that is separated from the first and second interfaces.

17 Claims, 4 Drawing Sheets

TECHNIQUES FOR PROVIDING POWER TO A SET OF POWERABLE DEVICES

BACKGROUND

Some conventional data storage systems include two power supplies and two storage processors for fault tolerance. Each power supply has enough capacity for both storage processors. Accordingly, if one power supply fails, the other power supply is capable of powering both storage processors and thus enabling the data storage system to continue operation (e.g., the storage processors can transition from a write-back caching mode to a write-through caching mode to ensure safe storage of data).

Similarly, each storage processor is capable of performing data storage operations independently of the other. Accordingly, if one storage processor fails, the other storage processor can continue to perform data storage operations so that the data storage system as a whole remains operational, e.g., the remaining storage processor can either (i) write cached data to non-volatile memory (e.g., magnetic disk storage, backup power supplied semiconductor memory, etc.) and then perform a graceful shutdown, or (ii) transition to a write-through caching mode and thus continue operation without the risk of losing data.

For additional fault tolerance, each power supply typically includes sensing circuits (e.g., an airflow sensor, a temperature sensor, etc.) that causes that power supply to perform a fault tolerant procedure upon detection of a detrimental condition. For example, upon detection of an over-temperature condition, a power supply can send an error signal to the storage processors directing the storage processors to dump the cache out to non-volatile memory and then safely shutdown.

SUMMARY

An improved power supply subsystem includes multiple power supplies and a peer-to-peer communications path between the power supplies. The peer-to-peer communications path enables an external device (e.g., a storage processor) to obtain the status of each power supply (i.e., the full status or a critical subset thereof) by communicating simply with one power supply. That is, the external device has redundant access to the status of any power supply (e.g., direct access, or alternatively access through the combination of direct access to another power supply and the peer-to-peer communications path). As a result, the external device has two ways to obtain the status of each power supply but does not need to have two dedicated communications ports to each power supply thus lessening the complexity and cost of the external device. Moreover, each power supply is preferably under control of a local processor and a local memory (e.g., flash EPROM) for easy disabling of certain fault tolerant procedures during testing (e.g., initial stress testing at the factory) and for convenient upgradability (e.g., automatic updating of power supply firmware).

One embodiment is directed to an electronic system (e.g., a data storage system) having a set of powerable devices (e.g., general computing devices, storage processors, data movers, blade servers, etc.), a first communications bus coupled to the set of powerable devices, and a second communications bus coupled to the set of powerable devices. The electronic system further includes a power supply subsystem which includes a first power supply having a first power circuit, a first controller adapted to control operation of the first power circuit, a first interface that connects the first controller to the set of powerable devices through the first communications bus, and a first bi-directional peer-to-peer port. The power supply subsystem further includes a second power supply having a second power circuit, a second controller adapted to control operation of the second power circuit, a second interface that connects the second controller to the set of powerable devices through the second communications bus, and a second bi-directional peer-to-peer port. The power supply subsystem further includes a bi-directional peer-to-peer communications channel interconnecting the first bi-directional peer-to-peer port of the first power supply and the second bi-directional peer-to-peer port of the second power supply to form, between the first and second power supplies, a communications link that is separated from the first and second communications buses.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An improved power supply subsystem includes two power supplies and a peer-to-peer communications path between the two power supplies. The peer-to-peer communications path enables an external device (e.g., a storage processor) to obtain the status of each power supply (i.e., the full status or a critical subset thereof) by communicating with the other power supply and over the peer-to-peer communications path between the two power supplies, as an alternative approach to communicating directly with that power supply. Accordingly, the external device has two ways to obtain the status of each power supply for fault tolerant redundancy, but is not required to have two dedicated communications ports to each power supply for such redundancy. Moreover, each power supply is preferably under control of a local processor and a local memory (e.g., flash EPROM) for easy disabling of certain fault tolerant procedures during diagnostic testing (e.g., initial stress testing at the factory) and for convenient upgradability (e.g., automatic updating of power supply firmware).

Figure 1:
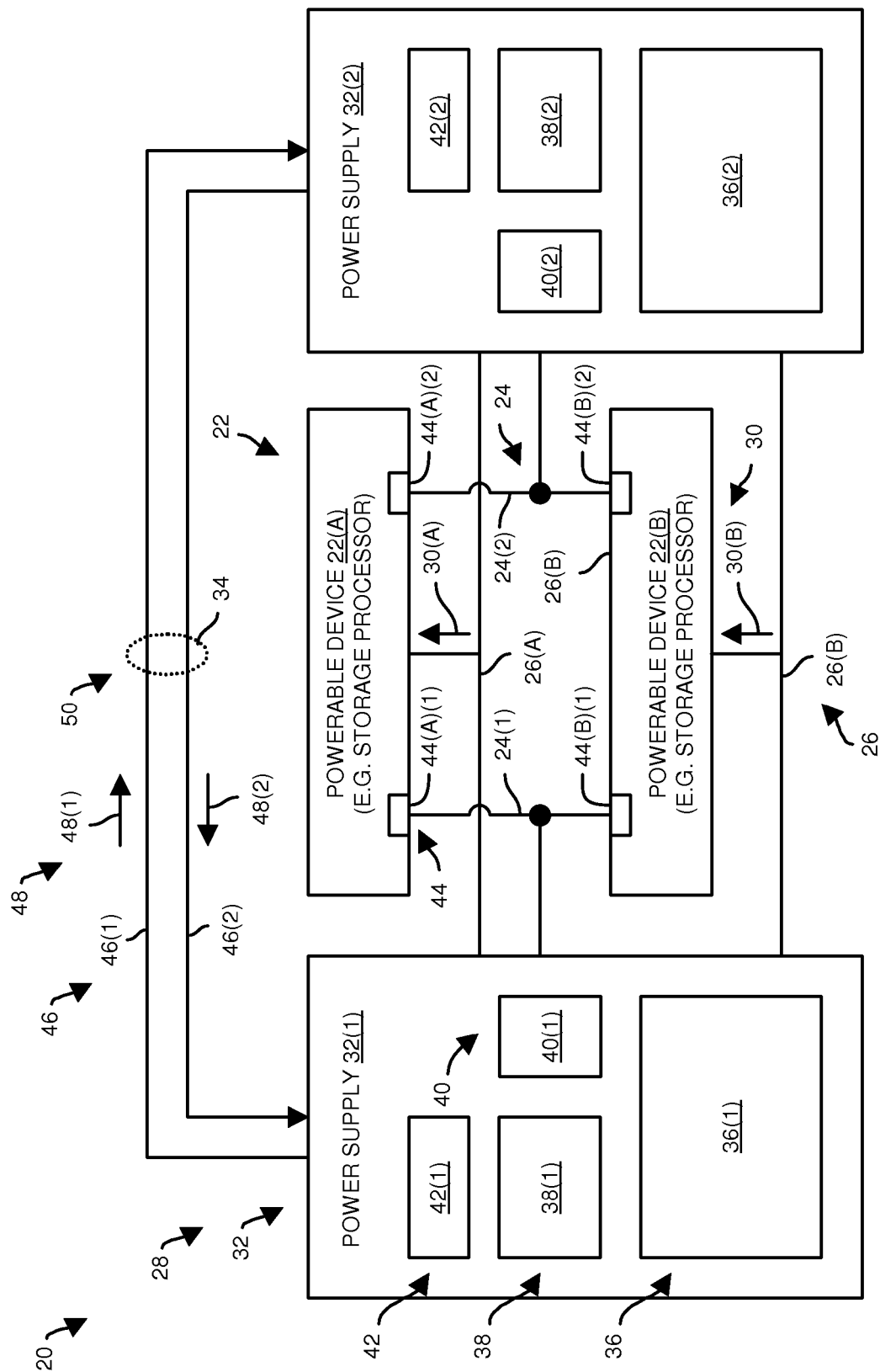
FIG. 1 is a block diagram of an electronic system having an improved power supply subsystem.

FIG. 1 shows an electronic system 20 having a set of powerable devices 22(A), 22(B) (collectively, powerable devices 22), communications buses 24(1), 24(2) (collectively, communications buses 24), sets of bus bars 26(A), 26(B) (collectively, sets of bus bars 26) and a power supply subsystem 28. The set of bus bars 26(A) (which in some arrangements is a network of bus traces on a printed circuit board) delivers power supply signals 30(A) from the power supply subsystem 28 to the powerable device 22(A). Similarly, the set of bus bars 26(B) delivers power supply signals 30(B) from the power supply subsystem 28 to the powerable device 22(B). Although each set of bus bars 26(A), 2(B) is shown as a single line in FIG. 1 for simplicity, each set of the bus bars 26(A), 26(B) includes multiple conductors (i.e., a hot leg and a return). The sets of bus bars 26(A), 26(B) are preferably electrically isolated from each other as shown in FIG. 1 so that a failure in one set of bus bars 26(A), 26(B) does not cause a failure in the other set of bus bars 26(A), 26(B).

It should be understood that the power supply signals 30(A), 30(B) refer to the power paths from the power supply subsystem 28 to the powerable devices 22. Signal-level power supply paths are distinct from these power paths 30(A), 30(B).

As shown in FIG. 1, the power supply subsystem 28 includes multiple power supplies 32(1), 32(2) (collectively, power supplies 32) and a bi-directional peer-to-peer communications channel 34 which is interconnected between the multiple power supplies 32. Each power supply 32 includes a power circuit 36, a controller 38, an interface 40 and bi-directional peer-to-peer port 42. That is, the power supply 32(1) includes a power circuit 36(1), a controller 38(1), an interface 40(1) and bi-directional peer-to-peer port 42(1). Similarly, the power supply 32(2) includes a power circuit 36(2), a controller 38(2), an interface 40(2) and bi-directional peer-to-peer port 42(2).

During operation of the system 20, the power circuits 36 are configured to combine their outputs in a current sharing manner when delivering the power supply signal 30(A) to the powerable device 22(A). Similarly, the power circuits 36 are configured to combine their outputs in a current sharing manner when delivering the power supply signal 30(B) to the powerable device 22(B). In turn, the powerable devices 22 perform useful work (e.g., computing operations).

In some arrangements, the powerable devices 22 are data moving and/or disk control circuits for a data storage system. In these arrangements, the powerable devices 22 operate as storage processors by caching data on behalf of one or more external host computers, and by moving the cached data into and out of a set of disk drives. The powerable devices 22 enjoy fault tolerant redundancy and thus are capable of operating in an optimized manner. For example, the powerable devices 22 are capable of write-back caching where write operations are confirmed once data is written to cache since the system 20 as a whole will remain operational with no data lost even if one powerable device 22 were to fail. That is, a remaining powerable device 22 would be available to dump the cache to the disk drives.

As further shown in FIG. 1, the powerable device 22(A) includes a dedicated communications port 44(A)(1) which is configured to connect to the communications bus 24(1), and a dedicated communications port 44(A)(2) which is configured to connect to the communications bus 24(2). Similarly, the powerable device 22(B) includes a dedicated communications port 44(B)(1) which is configured to connect to the communications bus 24(1), and a dedicated communications port 44(B)(2) which is configured to connect to the communications bus 24(2).

Each communications port 44(A)(1), 44(A)(2), 44(B)(1), 44(B)(2) (collectively, communications ports 44) includes transmission and receive circuitry. Accordingly, the powerable devices 22 are capable of issuing commands and queries to the power supplies 32 and receiving replies from the power supplies 32 through the communications ports 44.

In some arrangements, the communications buses 24 are I2C master/slave channels. In particular, the powerable device 22(A) is configured to operate as an I2C master, and thus issue commands and queries to the power supplies 32(1), 32(2) through the communications ports 44(A)(1), 44(A)(2) and through the communications buses 24(1), 24(2), respectively. Additionally, the power supplies 32(1), 32(2) are configured to operate as I2C slaves, and thus reply to these I2C master commands with I2C responses through the communications buses 24(1), 24(2) and through the communications ports 44(A)(1), 44(A)(2), respectively.

Similarly, the powerable device 22(B) is configured to operate as an I2C master and issue commands to the power supplies 32(1), 32(2) through the communications ports 44(B)(1), 44(B)(2) and through the communications buses 24(1), 24(2), respectively. Furthermore, the power supplies 32(1), 32(2) are configured to operate as I2C slaves by replying to these I2C master commands with I2C responses through the communications buses 24(1), 24(2) and through the communications ports 44(B)(1), 44(B)(2), respectively.

For communications between power supplies 32. the bi-directional peer-to-peer communications channel 34 connects the bi-directional peer-to-peer port 42(1) of the power supply 32(1) to the bi-directional peer-to-peer port 42(2) of the power supply 32(2), and is separate from the communications buses 24. Accordingly, if either of the communications buses 24 (or immediately adjacent circuitry) fails, that failure will not adversely effect the operation of the bi-directional peer-to-peer communications channel 34. Rather, assuming that the communications bus failure is localized only to the communications bus 24 itself or further only to the interfaces 40 and ports 44 connected to that communications bus 24, the communications channel 34 remains available to deliver status (e.g., a critical subset of full status) of each power supply 32 to the other power supply 32. Since each power supply 32 knows the status of the other power supply 32, each power supply 32 can convey that status of the other power supply 32 to the powerable devices 22 through the non-failed communications bus 24. Further details of this operation will be provided with reference to the following example.

Suppose that the interface 40(2) of the power supply 32(2) fails (or alternatively the port 44(A)(2) of the powerable device 22(A) fails) and renders the communications bus 24(2) unusable. Further suppose that the powerable devices 22 remain fully operational, and that both power supplies 32 are in all other respects operating normally (e.g., the power circuits 36 of both power supplies 32 continue to output power supply signals 30).

In this situation, both powerable devices 22 are capable of querying the power supply 32(1) directly through the communications bus 24(1) (e.g., both powerable devices 22 operate as an I2C master and separately query the power supply 32(1) with I2C commands). Accordingly, both powerable devices 22 can separately query the power supply 32(1) whether the power circuit 36(1) is still providing a power supply signal 30, and thus determine whether the power supply 32(1) is still operating properly, i.e., in a fully redundant manner. Furthermore, the power supply 32(1) is capable of sensing whether the power supply 32(2) is still providing a power supply signal 30 through the peer-to-peer communications channel 34. As a result, both powerable devices 22 can further ask the power supply 32(1) whether the power supply 32(2) is still providing power supply signals 30, and thus determine whether the power circuit 36(2) of the power supply 32(2) is still operating properly.

If the powerable devices 22 determine that both power supplies 32 are still in operation (i.e., both power circuits 36 are providing the power supply signals 30 to the bus bars 26), the powerable devices 22 can remain in their normal operating modes (e.g., both powerable devices 22 can continue to operate in write-back caching modes for fast responsiveness to external host computers). However, if the powerable devices 22 determine that the power supply 32(2) is no longer operating (i.e., the power circuit 36(2) is no longer outputting power supply signals 30 to the bus bars 26 due to a more extensive failure of the power supply 32(2)), the powerable devices 22 can transition to different operating modes (e.g., to write-through caching modes where operations are not confirmed until data is actually written out to the disk drives).

It should be understood that the ports 42 of the power supplies 32 operate to isolate the remaining power supply circuitry of each power supply 32 from external faults (e.g., a failure on the peer-to-peer communications channel 34). Similarly, the interfaces 40 of the power supplies 32 and the ports 44 of the powerable devices 22 operate to isolate the remaining power supply circuitry of each power supply 32 and the powerable devices 22 from external faults (e.g., a failure on a communications bus 24). Such a configuration provides robust fault isolation since the failure is prevented from spreading to other parts of the system 20. Furthermore, such a configuration provides the ability for each powerable device 22 to obtain the status (e.g., critical status) of a power supply 32 through redundant paths, even though each powerable device 22 does not have redundant ports directly to each power supply 32, and even though the system 20 does not have redundant communications buses 24 from each powerable device 22 to each power supply 32.

By way of example only, the peer-to-peer communications channel 34 includes a single bit line 46(1) leading from the power supply 32(1) to the power supply 32(2), and a single bit line 46(2) leading from the power supply 32(2) to the power supply 32(1) thus forming a bi-directional communications link 50. Such bit lines 46(1), 46(2) (collectively, lines 46) are capable of being simple conductors which are driven by output buffers at the respective ports 42(1), 42(2) of each power supply 32(1), 32(2). That is, a signal 48(1) on the bit line 46(1) is asserted (e.g., high) when the power circuit 36(1) is outputting power supply signals 30 and de-asserted (e.g., low) when the power circuit 36(1) is not outputting power supply signals 30. Similarly, a signal 48(2) on the bit line 46(2) is asserted when the power circuit 36(2) is outputting power supply signals 30 and de-asserted when the power circuit 36(2) is not outputting power supply signals 30. A sensor of the controller 38 at the opposite end is capable of sensing the high/low characteristics of the signals 48 and thus enable each power supply 32 to identify the output status of the power circuit 36 of the other power supply 32. In alternative arrangements, the power supplies 32 engage in more sophisticated peer-to-peer communications (e.g., messaging and responses using multi-bit signals). Further details will now be provided with reference to FIG. 2.

Figure 2:
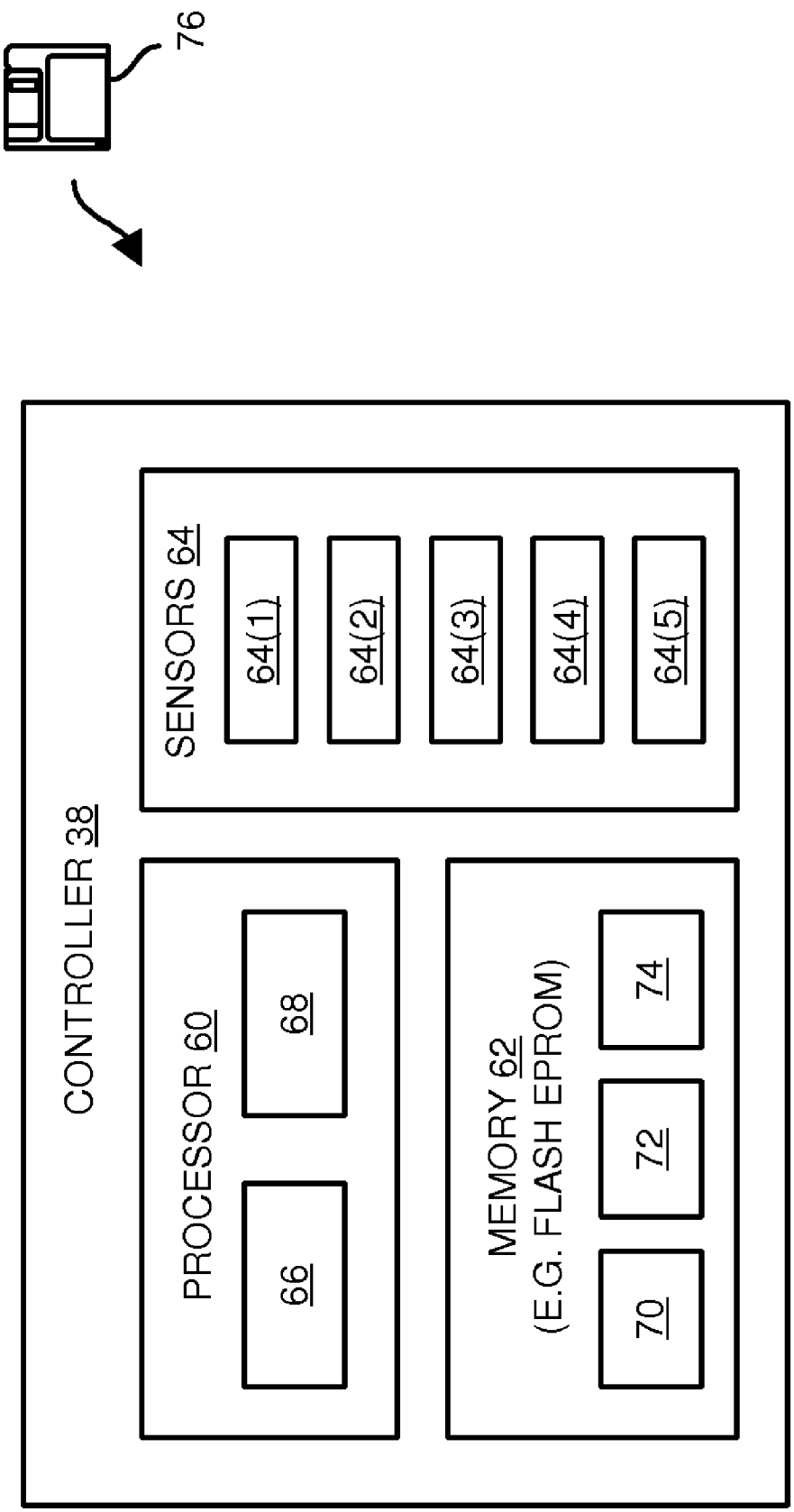
FIG. 2 is a block diagram of a controller of a power supply of the improved power supply subsystem.

FIG. 2 is a block diagram of a controller 38 of a power supply 32. As shown, the controller 38 includes a local processor 60, local memory 62, and a set of sensors 64. The local processor 60 includes an execution unit 66 and a set of control registers 68. The local memory 62 is configured to store, among other things, a startup procedure 70, a runtime application 72 having a set of fault detection and error handling routines, and statistical data 74 (part number, version number, manufacturing information, etc.). The set of sensors 64 includes, by way of example only, five sensors 64(1), . . . , 64(5) (e.g., a peer voltage sensor, a temperature sensor, an airflow sensor, a local current sensor, a local voltage sensor, etc.). However, it should be understood that a different number of sensors 64 and different types of sensors are suitable for use by the controller 38.

One or more computer program products 76 are capable of delivering the startup procedure 70, the runtime application 72, and at least a portion of the statistical data 74 into the memory 62 from an external source. Although the computer program products 76 are illustrated as a diskette by way of example only, a variety of communications and storage media are suitable for use (e.g., a set of CD-ROMs, disks, tapes, memory cards or sticks, network downloads, propagated signals, combinations thereof, etc.). In some arrangements, the memory 62 is programmable read only memory (e.g., flash EPROM), and the memory constructs 70, 72, 74 are programmed as firmware through a powerable device 22 and a communications bus 24 (FIG. 1). Specifically, a user downloads the memory constructs 70, 72, 74 from an external source through the powerable device 22 and the communications bus 24 into the memory 62 (e.g., at the factory). Alternatively, a powerable device 22 downloads the memory constructs 70, 72, 74 in an automated manner (e.g., during an upgrade process in the field).

In some arrangements, a powerable device 22 is configured to check for updates to its memory constructs 70, 72, 74 automatically. Here, the powerable device 22 compares the memory constructs 70, 72, 74 within the memory 62 with externally available memory constructs (e.g., by comparing date stamps). If the externally available memory constructs are newer and if there are no fault conditions, the powerable device 22 automatically performs an upgrade of the memory constructs 70, 72, 74 to the newer memory constructs. Along these lines, either powerable device 22 is capable of performing such a check and update. However, only one power supply 32 is updated at a time since the power supplies 32 do not provide power while the update takes place. Furthermore, the controllers 38 are configured to easily recover from an update process that has been interrupted or aborted for any reason (e.g., by using the earlier version still stored in the memory 62), thus enabling a new subsequent update attempt to occur at a later time.

When the electronic system 20 is initially turned on by a user, the power supplies 32 perform a startup routine. In particular, within the controller 38 of each power supply 32, the local processor 60 examines its control registers 68 for any special instructions or conditions and loads the code of the startup procedure 70 from the local memory 62 for execution by the execution unit 66. As a result of execution of the startup procedure 70, the controller 38 of the power supply 32 directs the power circuit 36 of the power supply 32 to perform (i) a timed ramp up of the power signals 30 so that the powerable devices 22 power up correctly and (ii) a self test (e.g., by polling the sensors 64 to confirm proper operation). In some arrangements, the power supplies 32 are configured to provide multiple voltages and the timing and sequence of these voltages are critical to avoid damaging circuitry of the electronic system 20.

Once the power circuits 36 of each power supply 32 is up and running (i.e., once the power circuit 36 provides the power signals 30 to the powerable devices 22 in a normal operating mode), the local processor 60 of that power supply 32 runs the runtime application 72 having the set of fault detection and error handling routines. Here, the local processor 60 again examines its control registers 68 for any special instructions or conditions and loads the code of the runtime application 72 from the local memory 62 for execution by the execution unit 66.

As the local processor 60 runs the application 72, the local processor 60 acquires data from the sensors 64. In particular, the local processor 60 senses operating conditions through the sensors 64 and compares these sensed operating conditions to predefined norms (e.g., whether a measured temperature falls within a predefined temperature range, whether a measured airflow falls within a predefined airflow range, and so on). The controller 38 is configured to provide the sensed operating conditions to the powerable devices 22 in response to requests for such information from the powerable devices 22. For example, in some arrangements, each powerable device 22 periodically polls the power supplies 32 for status (e.g., using I2C master commands). The power supplies 32 reply by providing the sensed operating conditions (e.g., using I2C responses). In turn, the powerable devices 22 can log this information in a database as well as adjust their operation if desired (e.g., the powerable devices 22 can switch from a write-back caching mode to a write-through mode if the powerable devices 22 detect a failure of one of the power supplies 32 to output the power supply signals 30).

During such operation, if any of the sensed operating conditions differs substantially from the predefined norms (e.g., if there is a sensed condition outside a normal operating range), the local processor 60 considers a fault to have occurred and the controller 38 performs an error handling routing based on the type of fault. For example, a major fault detection such as a detected over-current situation in combination with a low output voltage may signify a short circuit of the output voltage and direct the controller 38 to immediately shutdown the power circuit 36 in order to avoid significant damage to the system 20.

However, a minor fault detection such as a detected loss of backup power availability may simply cause the controller 38 to communicate this fact to the powerable devices 22 when the powerable devices 22 next poll the power supply 32 for status to enable the powerable devices 22 to change their modes of operation (e.g., to transition from a write-back caching mode to a write-through caching mode). In response to detection of such a minor fault, the system 20 remains operational in order to provide high availability (i.e., to remain available).

In the earlier-provided example, the loss of an interface 40(2) of the power supply 32(2) is capable of being considered a minor fault. That is, the output circuit 36(2) continues to provide power supply signals 30. In this situation, both powerable devices 22 are capable of determining that the output circuit 36(2) is still outputting the power supply signals 30 by querying the other power supply 32(1) which senses that the output circuit 36(2) is still providing the power supply signals 30. Accordingly, the powerable devices 22 are capable of determining that redundant power supply signals 30 are still available even though direct communications with the power supply 32(2) has been lost. As a result, the powerable devices 22 do not need to transfer from a write-back caching mode to a write-through caching mode or otherwise downgrade their performance since the system 20 essentially still has enough fault tolerant redundancy to sustain another failure (e.g., the failure of one of the power circuits 36) before there is a risk of losing data to yet another fault. Thus, the system 20 enjoys enhanced efficiencies (e.g., low latency write responses to external host computers) that do not exist in either conventional systems which do not have redundant access to power supply status, or conventional systems that require powerable devices to have redundant direct access to each power supply and redundant respective communications buses to each power supply.

Additionally, it should be understood that the power supplies 32 are easily upgradable. For example, suppose that a user wishes to upgrade the startup procedure 70 and/or the runtime procedure 72. The user does not need to remove and replace an entire power supply as is required with some conventional power supplies which are configured with rigid electronic circuitry. Rather, the user is capable of simply reprogramming the startup procedure 70 and/or the runtime procedure 72. In particular, the user simply overwrites the code (e.g., firmware) within the memory 62 with new code (e.g., the user performs a flash upgrade procedure of the memory 62).

In some arrangements, the user performs such an upgrade by communicating with one of the powerable devices 22. The powerable device 22, in turn, controls upgrading of the power supply memory 62 of a power supply 32. The same powerable device 22 is capable of then upgrading the power supply memory 62 of the other power supply 32.

Moreover, the flexibility provided by the power supply memory 62 enables a user (e.g., a technician, external automated equipment, the powerable devices 22 themselves, host software in an automated test environment, etc.) to substantially change the operation of the power supplies 32. Accordingly, the manufacturer is capable of using the same power supplies 32 in different applications on different systems. If a particular system requires a significantly different startup procedure or runtime procedure, the manufacturer simply programs appropriate code for those procedures into the memory 62.

Figure 3:
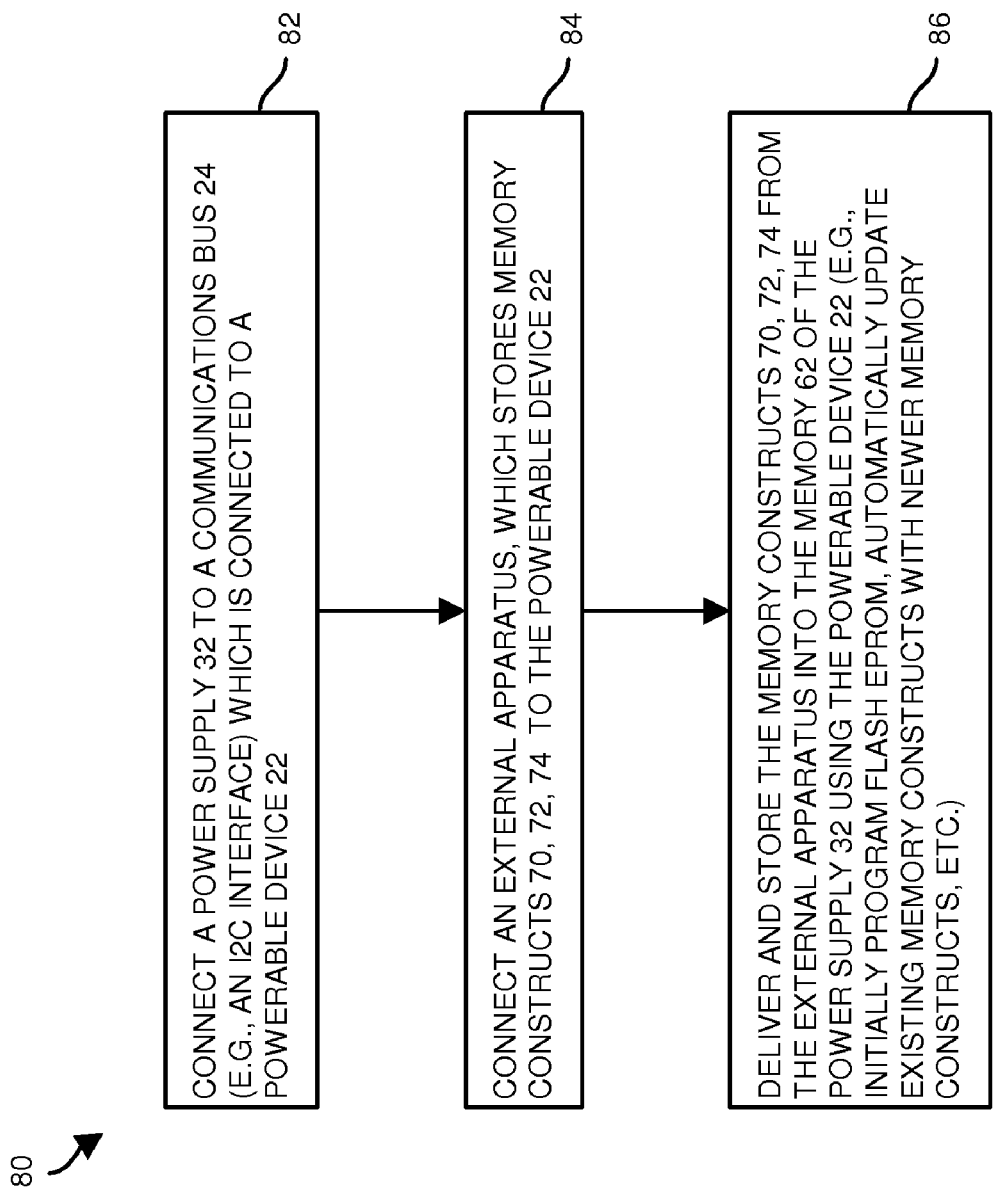
FIG. 3 is a flowchart of a procedure for programming the power supply of FIG. 2.

FIG. 3 is a flowchart of a procedure 80 which summarizes steps which are performed by a user (e.g., a person, an automated routing running on a powerable device 22, etc.) when programming the power supply 32(1). The user performs the procedure 80 when initially configuring the power supply 32(1) (e.g., at the factory, initially defining how the power supply 32(1) operates) or subsequently configuring the power supply 32(1) after it has been in use for some time (e.g., in the field, when upgrading the power supply 32(1)). The user repeats the procedure 80 for the power supply 32(2).

In step 82, the user connects the power supply 32(1) to the communications bus 24(1) (also see FIG. 1). At this point, both powerable devices 22 have electronic access to the power supply 32(1).

In step 84, the user connects an external programming device to one of the powerable devices 22. Preferably, this external programming device is a computerized apparatus which stores the memory constructs 70, 72, 74.

In step 86, the user loads the startup procedure 70, the runtime application 72, and the statistical data 74 from the external apparatus into the memory 62 (e.g., using a flash process). Preferably, the programming routine is automated in order to improve installation speed and to reduce the likelihood of error (e.g., a powerable device 22 compares the existing memory constructs 70, 72, 74 to externally available memory constructs and updates the memory constructs 70, 72, 74 with the externally available memory constructs if the externally available memory constructs are newer).

One advantage to programming the power supplies 32 through the powerable devices 22 is that the powerable devices 22 are preferably remotely accessible (e.g., accessible over a network). Accordingly, power supplies 32 are capable of being upgraded remotely using software.

Furthermore, it should be understood that the manufacturer is capable of easily masking out detection of particular operating conditions using the power supplies 32. In particular, during testing of the system 20 (e.g., during diagnostic testing, during a burn-in period, during margin testing, etc.), the manufacturer is capable of loading a particular control code into the control registers 68 which effectively disable the controller 38 from sensing the occurrence of certain operating conditions. As a result, the manufacturer is capable of stressing the system 20 beyond limits that would normally cause the system 20 to enter an error handling mode.

For example, suppose that the power supplies 32 of the system 20 are configured to shutdown if the power supplies 32 detect an operating temperature that is higher than 100 degrees Fahrenheit. However, further suppose that the manufacturer wishes to see if the powerable devices 22 are capable of running for an extended period at 110 degrees Fahrenheit. To test a conventional system, a manufacturer typically must physically disable a temperature sensor of that system in order to perform such a stress test. However, with the flexibility provided by the controller 38, a manufacturer of the system 20 can simply load a mask into the control registers 68 to programmably disable the temperature sensing function when performing a stress test. Such masking is capable of occurring in an automated manner by testing equipment connected to the system 20 thus improving setup time for testing as well as reducing the likelihood of manual error.

As a result of the above, the controllers 38 of the power supplies 32 are easily adapted to selectively ignore particular operating conditions, or combinations of operating conditions. Thus, a user does not need to manually bypass any sensors.

Figure 4:
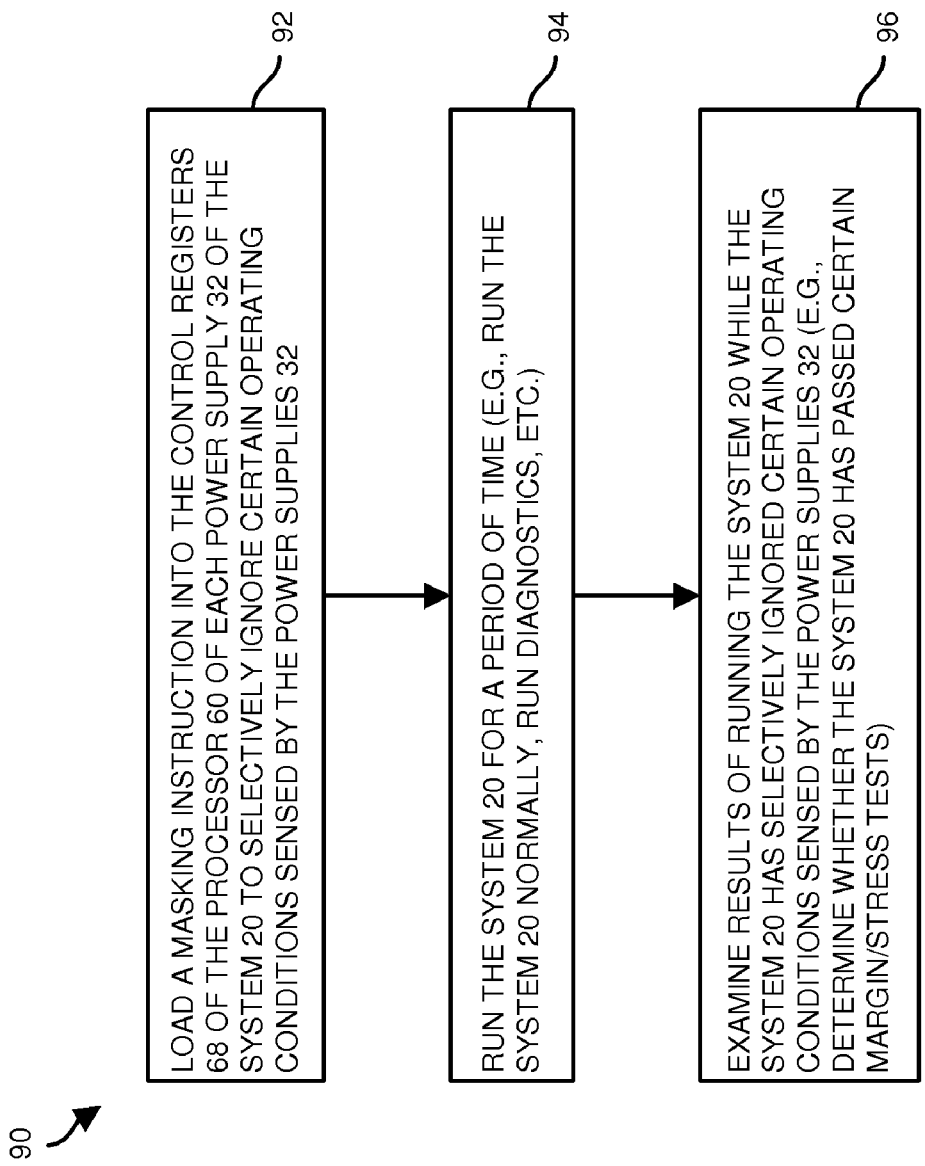
FIG. 4 is a flowchart of a procedure for testing the electronic system of FIG. 1.

FIG. 4 is a flowchart of a procedure 90 which summarizes steps which are performed by a user when testing the electronic system 20. The user is capable of performing the procedure 90 when initially at the factory (e.g., during burn-in or during margin testing) or at an installation location to diagnose and/or test the system 20 in the field.

In step 92, the user (e.g., host software in an automated test environment) loads a masking instruction into the control registers 68 of the processor 60 of each power supply 32. The masking instruction directs the processor 60 to selectively ignore certain operating conditions (e.g., the temperature within the system 20, the amount of airflow through the system 20, etc.) which are typically sensed by the sensors 64.

In step 94, the user runs the system 20 for a period of time. For example, the user can allow the system 20 to operate in a normal operating mode. Alternative, the user can run diagnostics or exercising programs to simulate various operations. During this time, the manufacturer can modify operating conditions without the system 20 transitioning into a fault tolerant mode. For example, at the factory, the manufacturer can disable the temperature sensor using software so that the system 20 and raise the temperature of the system 20 higher (or lower) than the predefined operating temperature range. Here, the power supplies 32 and the powerable devices 22 will not determine that the temperature difference should result in the performance of an error handling procedure by the system 20 (e.g., a shutdown). Rather, the manufacturer can run the system 20 at the different temperature for robust margin testing.

In step 96, the user examines the results of running the system 20 while the power supplies 32 have selectively ignored certain operating conditions. As a result, the user has conveniently tested the system 20 while disabling certain sensing functions using software without being hindered by normal sensing functions of the power supplies 32 (e.g., without having to manually disconnect or bypass the sensor operations of each power supply 32 during testing).

As mentioned above, an improved power supply subsystem 28 includes multiple power supplies 32 and a peer-to-peer communications path 34 between the power supplies 32. The peer-to-peer communications path 34 enables a powerable device 22 (e.g., a storage processor) to obtain the status of each power supply 32 by communicating simply with one power supply 32 (e.g., the power supply 32(1)). That is, the powerable device 22 has redundant access to the status of any power supply 32 (e.g., direct access to the power supply 32(1) or alternatively access to the power supply 32(1) through the combination of direct access to another power supply 32(2) and the peer-to-peer communications path 34). As a result, the powerable device 22 has two ways to obtain the status of each power supply 32 but does not need to have two dedicated communications ports 44 to each power supply 32 thus lessening the complexity and cost of the device 22. Moreover, each power supply 32 is preferably under control of a local processor 60 and a local memory 62 (e.g., flash EPROM) for easy disabling of certain fault tolerant procedures during testing (e.g., margin testing at the factory) and for convenient upgradability.

While this invention has been particularly shown and described with references to preferred embodiments thereof, it will be understood by those skilled in the art that various changes in form and details may be made therein without departing from the spirit and scope of the invention as defined by the appended claims.

For example, the procedure 80 for programming the power supplies 32 through the powerable devices 22 was provided above by way of example only. Other ways are suitable for use as well such as by connecting an external programming device directly to the power supplies 32 and thus circumventing the use of the powerable devices 22 during programming.

What is claimed is:

1. A power supply subsystem, comprising:
   a first power supply having a first power circuit, a first controller adapted to control operation of the first power circuit, a first interface adapted to connect the first controller to an external device, and a first bi-directional peer-to-peer port,
   wherein the first controller includes a first local processor and a first local memory adapted to store first power supply firmware,
   wherein the first local processor is adapted to direct the first power circuit to provide power to the external device in response to execution of the first power supply firmware stored in the first local memory,
   wherein the first controller further includes a first set of sensors coupled to the first processor,
   wherein the first controller, when executing the first power supply firmware stored in the first local memory, is adapted to detect a first set of operating conditions from the first set of sensors and direct operation of the first power circuit based on the first set of operating conditions during a normal operating mode, and
   wherein the first controller is further adapted to selectively ignore at least some of the first set of operating conditions while directing operation of the first power circuit during a test mode;

a second power supply having a second power circuit, a second controller adapted to control operation of the second power circuit, a second interface adapted to connect the second controller to the external device, and a second bi-directional peer-to-peer port, wherein the second controller includes a second local processor and a second local memory adapted to store second power supply firmware, wherein the second local processor is adapted to direct the second power circuit to provide power to the external device in response to execution of the second power supply firmware stored in the second local memory, wherein the second controller further includes a second set of sensors coupled to the second processor, and wherein the second controller, when executing the second power supply firmware stored in the second local memory, is adapted to detect a second set of operating conditions from the second set of sensors and direct operation of the second power circuit based on the second set of operating conditions during the normal operating mode, and wherein the second controller is further adapted to selectively ignore at least some of the second set of operating conditions while directing operation of the second power circuit during the test mode; and a bi-directional peer-to-peer communications channel interconnecting the first bi-directional peer-to-peer port of the first power supply and the second bi-directional peer-to-peer port of the second power supply to form, between the first and second power supplies, a communications link that is separated from the first and second interfaces.

2. A power supply subsystem as in claim 1 wherein the first controller is adapted to:

sense status of the second power supply over the second bi-directional peer-to-peer port, the communications link, and the first bi-directional peer-to-peer port, and provide the status of the second power supply to the external device through the first interface; and wherein the second controller is adapted to:

sense status of the first power supply over the first bi-directional peer-to-peer port, the communications link, and the second bi-directional peer-to-peer port, and provide the status of the first power supply to the external device through the second interface.

3. A power supply subsystem as in claim 2 wherein the first controller of the first power supply is adapted to provide I2C slave responses to the external device through the first interface in response to I2C master commands from the external device through the first interface; and wherein the second controller of the second power supply is adapted to provide I2C slave responses to the external device through the second interface in response to I2C master commands from the external device through the second interface.

4. A power supply subsystem as in claim 1 wherein the first local memory of the first controller is adapted to overwrite the first power supply firmware in response to a first flash upgrade procedure performed by the external device; and wherein the second local memory of the second controller is adapted to overwrite the second power supply firmware in response to a second flash upgrade procedure performed by the external device.

5. A power supply subsystem as in claim 4 wherein the first interface is a first I2C port;

wherein the first local memory is adapted to overwrite the first power supply firmware in response to upgrade signals received from the external device through the first I2C port;

wherein the second interface is a second I2C port; and wherein the second local memory is adapted to overwrite the second power supply firmware in response to upgrade signals received from the external device through the second I2C port.

6. A power supply subsystem as in claim 1 wherein the first controller is adapted to have the first power supply firmware updated by the external device in an automated manner when the external device automatically compares the first power supply firmware with external available power supply firmware and determines that the externally available power supply firmware is newer than the first power supply firmware; and wherein the second controller is adapted to have the second power supply firmware updated by the external device in an automated manner when the external device automatically compares the second power supply firmware with external available power supply firmware and determines that the externally available power supply firmware is newer than the second power supply firmware.

7. A power supply subsystem as in claim 1 wherein the first power circuit of the first power supply is adapted to provide power to multiple external devices respectively through multiple power buses simultaneously;

wherein the first interface of the first power supply is adapted to connect to a first shared communications bus coupled to the multiple external devices;

wherein the second power circuit of the second power supply is adapted to provide power to the multiple external devices respectively through the multiple power buses simultaneously; and wherein the second interface of the first power supply is adapted to connect to a second shared communications bus coupled to the multiple external devices.

8. A power supply subsystem as in claim 1 wherein the first controller is further adapted to receive a masking instruction which is adapted to disable a temperature sensor and indicate that an over-temperature situation has occurred; and wherein the first controller, when selectively ignoring at least some of the first set of operating conditions while directing operation of the first power circuit during a test mode, is adapted to perform an over-temperature error handling procedure in response to the masking instruction.

9. A power supply subsystem as in claim 1 wherein the first controller is further adapted to receive a masking instruction which is adapted to disable an airflow sensor and indicate that a low-airflow situation has occurred; and wherein the first controller, when selectively ignoring at least some of the first set of operating conditions while directing operation of the first power circuit during a test mode, is adapted to perform a low-airflow error handling procedure in response to the masking instruction.

10. An electronic system, comprising:

a set of powerable devices;

a first communications bus coupled to the set of powerable devices;

a second communications bus coupled to the set of powerable devices; and a power supply subsystem which includes:
- a first power supply having a first power circuit, a first controller adapted to control operation of the first power circuit, a first interface which couples the first controller to the set of powerable devices through the first communications bus, and a first bi-directional peer-to-peer port,
  - wherein the first controller includes a first local processor and a first local memory adapted to store first power supply firmware,
  - wherein the first local processor is adapted to direct the first power circuit to provide power to the set of powerable devices in response to execution of the first power supply firmware stored in the first local memory,
  - wherein the first controller further includes a first set of sensors coupled to the first processor,
  - wherein the first controller, when executing the first power supply firmware stored in the first local memory, is adapted to detect a first set of operating conditions from the first set of sensors and direct operation of the first power circuit based on the first set of operating conditions during a normal operating mode, and
  - wherein the first controller is further adapted to selectively ignore or modify the thresholds of at least some of the first set of operating conditions while directing operation of the first power circuit during a test mode;
- a second power supply having a second power circuit, a second controller adapted to control operation of the second power circuit, a second interface which couples the second controller to the set of powerable devices through the second communications bus, and a second bi-directional peer-to-peer port,
  - wherein the second controller includes a second local processor and a second local memory adapted to store second power supply firmware,
  - wherein the second local processor is adapted to direct the second power circuit to provide power to the set of powerable devices in response to execution of the second power supply firmware stored in the second local memory,
  - wherein the second controller further includes a second set of sensors coupled to the second processor,
  - wherein the second controller, when executing the second power supply firmware stored in the second local memory, is adapted to detect a second set of operating conditions from the second set of sensors and direct operation of the second power circuit based on the second set of operating conditions during the normal operating mode, and
  - wherein the second controller is further adapted to selectively ignore or modify the thresholds of at least some of the second set of operating conditions while directing operation of the second power circuit during the test mode; and
- a bi-directional peer-to-peer communications channel interconnecting the first bi-directional peer-to-peer port of the first power supply and the second bi-directional peer-to-peer port of the second power supply to form, between the first and second power supplies, a communications link that is separated from the first and second communications buses.

11. An electronic system as in claim 10 wherein the first controller of the first power supply is adapted to:
- sense status of the second power supply over the second bi-directional peer-to-peer port, the communications link, and the first bi-directional peer-to-peer port, and
- provide the status of the second power supply to the external device through the first interface; and wherein the second controller of the second power supply is adapted to:
- sense status of the first power supply over the first bi-directional peer-to-peer port, the communications link, and the second bi-directional peer-to-peer port, and
- provide the status of the first power supply to the external device through the second interface.

12. An electronic system as in claim 11 wherein the first controller of the first power supply is adapted to provide I2C slave responses to the set of powerable devices through the first interface in response to I2C master commands from the set of powerable devices through the first interface; and
- wherein the second controller of the second power supply is adapted to provide I2C slave responses to the set of powerable devices through the second interface in response to I2C master commands from the set of powerable devices through the second interface.

13. An electronic system as in claim 10 wherein the first local memory of the first controller is adapted to overwrite the first power supply firmware in response to a first flash upgrade procedure performed by the set of powerable devices; and
- wherein the second local memory of the second controller is adapted to overwrite the second power supply firmware in response to a second flash upgrade procedure performed by the set of powerable devices.

14. An electronic system as in claim 13 wherein the first interface is a first I2C port;
- wherein the first local memory is adapted to overwrite the first power supply firmware in response to upgrade signals received from the set of powerable devices through the first I2C port;
- wherein the second interface is a second I2C port; and
- wherein the second local memory is adapted to overwrite the second power supply firmware in response to upgrade signals received from the set of powerable devices through the second I2C port.

15. An electronic system as in claim 10 wherein the first power circuit of the first power supply is adapted to provide power to multiple external devices respectively through multiple power buses simultaneously;
- wherein the first interface of the first power supply is adapted to connect to a first shared communications bus coupled to the multiple external devices;
- wherein the second power circuit of the second power supply is adapted to provide power to the multiple external devices respectively through the multiple power buses simultaneously; and
- wherein the second interface of the first power supply is adapted to connect to a second shared communications bus coupled to the multiple external devices.

16. An electronic system as in claim 10 wherein the first controller is further adapted to receive a masking instruction which is adapted to disable a temperature sensor and indicate that an over-temperature situation has occurred; and
- wherein the first controller, when selectively ignoring at least some of the first set of operating conditions while directing operation of the first power circuit during a test mode, is adapted to perform an over-temperature error handling procedure in response to the masking instruction.

17. An electronic system as in claim 10 wherein the first controller is further adapted to receive a masking instruction which is adapted to disable an airflow sensor and indicate that a low-airflow situation has occurred; and wherein the first controller, when selectively ignoring at least some of the first set of operating conditions while directing operation of the first power circuit during a test mode, is adapted to perform a low-airflow error handling procedure in response to the masking instruction.

* * * * *